March 31, 1959 — M. PELLADEAU — 2,879,713
ROTARY ENGINES
Filed Feb. 23, 1956 — 2 Sheets-Sheet 1

INVENTOR
MAURICE PELLADEAU
BY
ATTORNEY

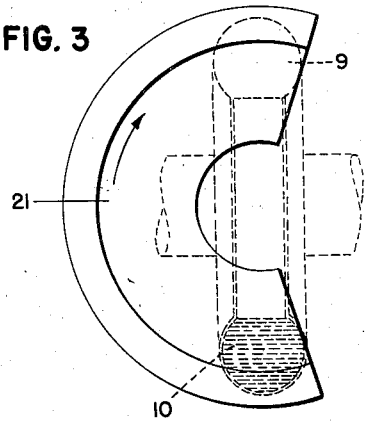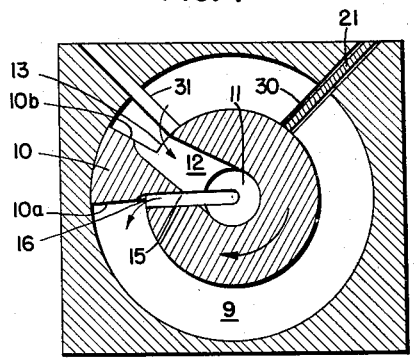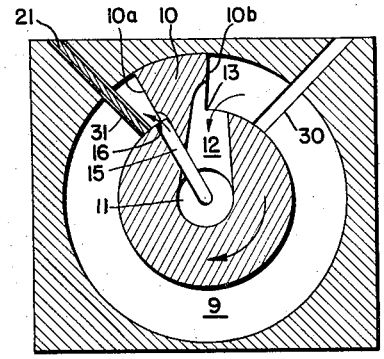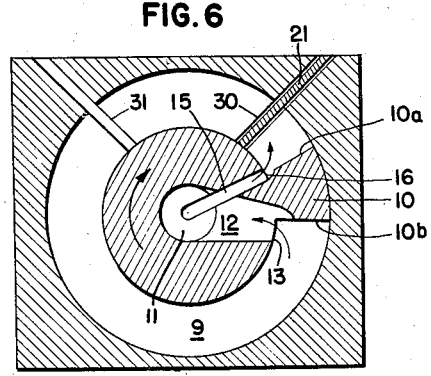

United States Patent Office 2,879,713
Patented Mar. 31, 1959

2,879,713

ROTARY ENGINES

Maurice Pelladeau, Paris, France, assignor of one-half to Standard Research Consultants, Inc., New York, N.Y.

Application February 23, 1956, Serial No. 567,371

Claims priority, application France August 1, 1955

14 Claims. (Cl. 103—125)

This invention relates to a fluid driven pump or engine of the rotary abutment type. Pumps or engines of this general type are known, having an operating chamber of revolution formed around a shaft having an abutment type piston which moves in a continuous circular motion in said chamber, and having a valve member which, together with the piston, divides the operating chamber into at least two parts, with fluid inlet and outlet orifices in the shaft connected to conduits which discharge into the operating chamber immediately in front of and immediately behind the piston. Such devices customarily provide means for controlling the operation of the valve member in synchronization with the movement of the piston, so as to permit the piston to pass it as it moves through the operating chamber.

In order to assure continuity of the operation of such machines, two or more such valve members are generally provided so as to shut off the working or operating chamber at symmetrically arranged points so that when one of them is arranged in position to allow the piston to pass, the other closes off the chamber, usually at a symmetrically opposite side.

In the operation of such pumps or engines, difficulties have been experienced in driving the valve members in synchronism with the movement of the piston, without creating excessive leakage of fluid and the risk of seizing of the parts, particularly if they operate under high pressures or with fluids, such as steam, at relatively high temperatures.

The primary object of this invention, therefore, is the provision of a machine of this type which avoids these drawbacks of the prior art and which can be economically made with a minimum of parts, occupying a relatively small space.

To this end, one of the essential features of the invention comprises a valve member with a body in the form of a sector of a cone which rotates in a conical slot provided in the body of the machine, the axis of said valve being arranged in the longitudinal plane of symmetry of the operating chamber, the valve cutting across the operating chamber in timed relationship to the movement of the piston in said chamber.

By virtue of this arrangement, the valve member intersects the operating chamber perpendicularly during the movement of the piston therein and together with the piston, divides the working chamber into two portions of unequal area, one being relatively large and supplying the greater part of the work, and the other being relatively smaller and supplying a lesser part of the work.

Another feature of the invention assures the operation of said valve at a speed which causes it to rotate about its own axis in a complete revolution while the piston itself makes a complete revolution in the working chamber. This is accomplished by connecting the valve to a coaxial bevel pinion, the axis of which is stationary with respect to the walls of the working chamber, the pinion being driven by a similar pinion of the same diameter concentric with and keyed to the drive shaft of the machine.

In order to equalize the forces driving said valve member, in accordance with another feature of the invention, the valve is driven in rotation by a train of differential pinions, comprising the two aforesaid bevel pinions and two additional and similar idler pinions of the same diameter, each of which is coaxial with one of said first mentioned pinions. The arrangement is such that each of these four gears is in engagement with two of the three others.

In accordance with a further feature of the machine, and in order to assure a minimum of leakage, the working parts are enclosed in a housing comprising only two parts, the housing also forming bearing supports for the operating parts of the machine.

Further objects will appear from reference to the accompanying drawings and specification in which one practical embodiment of the machine is illustrated and described by way of example.

Figure 3 is a fragmentary detail showing the valve member in plan view.

Figures 4, 5 and 6 are sectional views, similar to Figure 2, but showing the operating parts of the machine in successively different operating positions.

Figure 2:
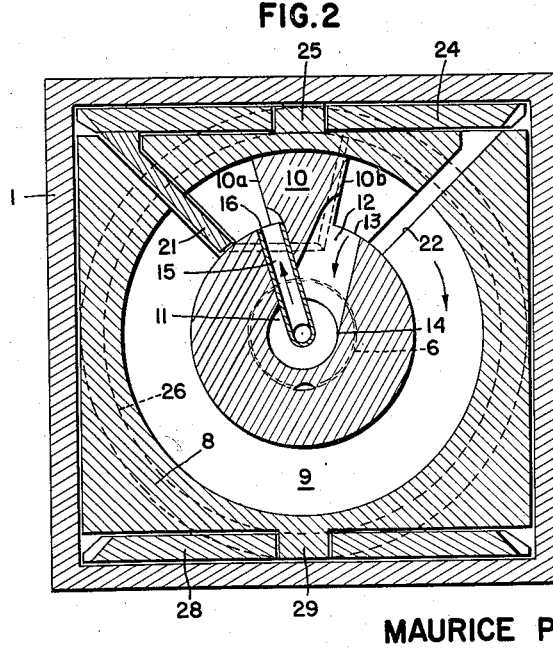
Figure 2 is a central, vertical, sectional view taken along the line II—II of Figure 1.

As shown for purposes of illustration in the drawings, the machine has a housing 1 with a cover 2 secured thereto by bolts 3 enclosing a body 8, 8a, formed in two symmetrical halves. The housing provides suitable bearings 4, 5 for the operating shaft 6 at one end, and for the stub projection 7 of the body 8, which projection serves as an extension of the shaft 6, at the other end, the shaft 6 extending through the body 8a and into the body 8, terminating therein. A piston 10, which may be integral with the shaft 6, extends radially thereof into an annular working chamber 9 formed in the body 8, 8a. The shaft is tubular at its free end extending outwardly of the machine so as to constitute an outlet passage 11 which is connected by radial port 12 with the outlet orifice 13, arranged immediately to the right of the piston 10, as shown in Figure 2. The passage 11 is of large diameter and receives an inlet conduit 14 of smaller diameter, this latter conduit being connected by radial extension conduit 15 to the inlet orifice 16 located immediately to the left of the piston 10 as shown in Figure 2.

The slot 22 intersects the chamber 9 at 30 and 31 as shown in the drawings. The valve is retained and guided in its slot by two substantially symmetrical half body portions 8' and 8a' and these are connected to the body 8, 8a, respectively, by pins 32. The halves are united at their upper ends by the gear 24 which is seated over their stub extensions 25.

The valve, as best shown in Figure 3, comprises a truncated cone in configuration with its axis arranged radially with respect to the axis of the shaft 6, a portion of the cone being cut away, leaving a sector 21.

Figure 1:
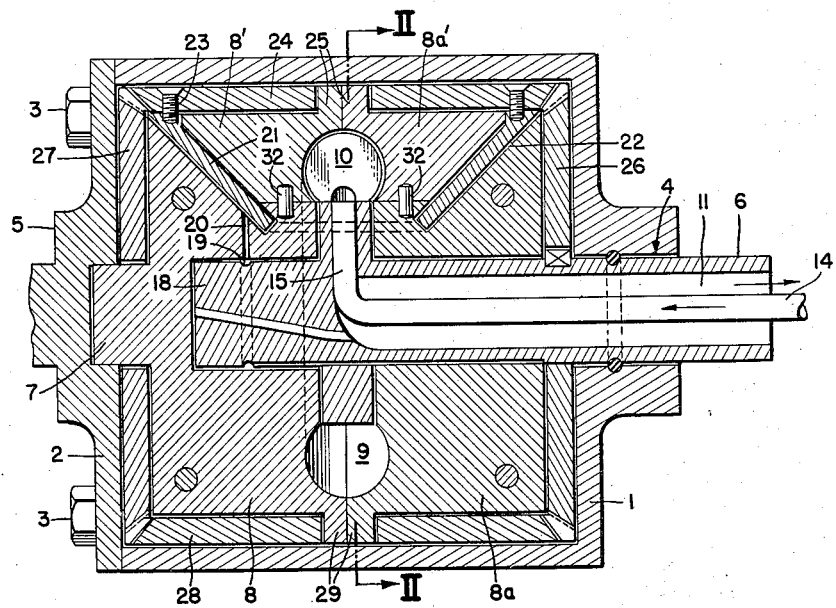
Figure 1 is a vertical, longitudinal section of the machine, taken along its axis.

A bevel pinion gear 24 is fastened to the upper rim of the valve by screws 23, as shown in Figure 1, and this gear has its central bore seated over the extensions 25 which form an axle or journal therefore.

This pinion 24 meshes with two similar bevel pinions 26, 27, of the same diameter, one of which 26 is keyed to the shaft 6 and acts as the driver gear. The other, 27, is mounted to idle on the extension 7 of the body 8 of the machine, opposite to and coaxial with the shaft 6 and gear 26.

Both of these latter two gears mesh with a fourth gear 28, of the same diameter, opposite to and coaxial with the gear 24, and mounted to idle on the cylindrical extension 29 of the body 8, 8a.

In the operation of the device, assuming the body 1 to be stationary, the introduction of a fluid under pressure, such as steam, into the conduit 14 will cause it to flow through the passage 15, orifice 16 into the working chamber 9, Figure 2, which is closed on one side by the valve 21, and on the other by the piston or abutment 10, the pressure taking effect against the body of the sector 21 as a backstop, forcing the piston to rotate to the right and causing the shaft 6, of which the piston is an integral part, to turn. The rotation of the shaft is transmitted through pinion gear 26 to the other gears 24 and 28, in a manner well known, and all rotate at the same speed, the idler 27 being thus acted on symmetrically by opposite and equal forces which contribute to maintaining the device in equilibrium.

The valve 21, being fixed to the gear 24, moves with it, so as the piston moves in the direction of the arrow, Figure 2, the valve sector rotates in its slot 22 in synchronism therewith, and the construction and arrangement of the parts are such that the piston passes through the open or cut-away portion of the valve as their positions intersect. The volume of the chamber 9 between the valve 21 and the piston face 10a provides an inlet chamber, while the volume on the other side of the piston, communicating with the outlet orifice 13, and between the piston face 10b and valve 21 provides an outlet or compression chamber.

As will be noted in Figure 3, the conical sector is movable in its slot to divide the working chamber 9 into two symmetrical regions, and it fully shuts off one of these regions before it begins to open the other. Because of this arrangement, the working chamber 9 is constantly shut off in at least one region and the machine always operates under the same conditions regardless of the orientation of the piston, and whether the machine is in use as a pump or as an engine. In the embodiment shown in Figure 3, as soon as the chamber is shut off at the upper part of the figure, the valve begins to open the chamber at the lower part of the figure.

Figures 4 to 6 show the piston 10 and valve 21 in their various operating phases. In Figure 4, the second region 30 is shut off by the valve while the first region 31 is free, thus the piston can pass through the first region 31. The discharge takes place, with the piston moving in the direction of the arrow, through the port 13 and passageway 12, between the piston face 10b and the cut-off region 30, while the intake is between the cut-off region 30 and the piston face 10a, the pressure of the supply fluid taking effect between the valve 21 and the piston face 10a to move the piston in its rotary path.

As the piston moves through the region 31, the valve closes it, thereby opening region 30. The exhaust then takes place through the port 13 and the passage 12, between the piston face 10b and the cut-off region 31, while the intake is through the passage 15 and orifice 16 into the chamber 9, between the cut-off region 31 and the piston face 10a, as shown in Figure 5.

The piston may then pass freely through the region 30 whereupon the valve moves to close this region, as shown in Figure 6, opening the region 31. The exhaust takes place through the port 13 between the piston face 10b and the region 30, the piston moving in a clockwise direction, and the intake is through the port 16, between the region 30 and the piston face 10a. In each of these several views the force of the pressure fluid is exerted between the closed portion of the valve 21 and the piston 10 to move the piston through the working chamber.

While one embodiment of the invention has been described and illustrated, it will be understood that changes in the construction and design may be made without departing from the spirit of the invention as defined by the appended claims.

I claim:

1. A fluid motor, pump or the like, comprising a housing, a body immovable within said housing and having an annular working chamber therein, a rotatable shaft extending into said body and housing, a piston on said shaft extending into said chamber and being movable therein, an inlet and exhaust port for said chamber in said shaft, one on each side of said piston, for receiving and discharging a fluid under pressure, and a valve supported in said body synchronized for movement with the movement of said piston, said valve cutting across said chamber at opposite portions thereof and dividing said chamber into inlet and discharge regions, respectively, as the piston and valve rotate in said chamber, the valve providing for the passage of the piston therethrough where they meet in the chamber, the pressure fluid taking effect between the valve and the piston to cause the piston to move in said chamber.

2. A device according to claim 1 in which the valve fully closes one region of the chamber before it begins to open another.

3. A device according to claim 1 in which the body has a conical slot intersecting said chamber and said valve is a conical member movable in said slot.

4. A device according to claim 1 in which the body has a conical slot intersecting said chamber and said valve is a conical member movable in said slot, said valve having a cut-away portion, the piston passing through said portion when it intersects the same in said chamber.

5. A fluid motor, pump or the like comprising a housing, a body within said housing having an annular working chamber therein, a conical slot in said body intersecting said chamber at opposite portions therein, a rotatable shaft extending into said housing and body, a piston on said shaft extending into said chamber and being movable therein, a conical valve movable in said slot and intersecting said chamber at said opposite portions, said valve having a cut-away portion to accommodate the passage of said piston when they intersect in said chamber, means within said housing connected to said valve and shaft and to each other for driving said piston and valve in synchronism when the shaft is rotated, and means within said housing connected, respectively, to each of said driving means and to each other for balancing said driving means.

6. A fluid motor, pump or the like comprising a housing, a body within said housing formed of substantially symmetrical halves having a portion of an annular working chamber therebetween, a wall defining a conical recess formed in said body, a pair of supplementary body half sections of truncated, conical form when joined, seated in said recess but spaced from said wall to form a conical slot between said wall and said supplementary sections, said sections having the remaining portion of said annular working chamber between them, said remaining portion mating with said first mentioned body halves to complete said working chamber; a conical valve seated in said slot, said recess and valve intersecting said chamber at a plurality of points; a shaft extending into said body and having a piston extending into said chamber, said valve having a cut-away portion to accommodate the passage of the piston in said chamber when they intersect, and means for driving said valve and piston synchronously.

7. A device according to claim 6 in which said last named means comprises said half sections with a stub shaft extending therefrom and a gear mounted for rotation thereon, said gear being fixed to said valve; and said shaft has a gear fixed thereon, said gears being in driving engagement with each other.

8. A device according to claim 6 in which said half sections are immovably connected to said body.

9. A device according to claim 6 in which said last named means comprises a gear fixed on said shaft, and intermeshing gears supported on said body, said last named gears being driven by said first named gear.

10. A device according to claim 6 in which said last named means comprises a gear fixed on said shaft and intermeshing gears supported on said body, each of said gears lying between a portion of said body and a wall of said housing, said last named gears being driven by said first named gear.

11. A device according to claim 6 in which said last named means comprises a train of intermeshing gears, each gear being disposed at an angle with respect to the next adjacent gear.

12. A device according to claim 6 in which said last named means comprises a train of intermeshing gears, each gear being disposed at a right angle with respect to the next adjacent gear, each gear lying between a portion of said body and a wall of said housing.

13. A fluid motor, pump or the like comprising a housing, a body immovable within said housing having a working chamber and a piston working therein, said body having at least two opposite portions supported by said housing, a shaft extending into said housing and body, said piston being connected to said shaft, one end of said housing forming a bearing for said shaft, a portion of said body forming an extension of said shaft, said housing having a socket adjacent said extension, said extension being supported in said socket.

14. A fluid motor, pump or the like comprising a housing, a body immovable within said housing having an annular working chamber therein, a rotatable shaft extending into said body and housing, a piston on said shaft extending into said chamber and being movable therein, an inlet passage in said shaft discharging into said chamber on one side of said piston, a discharge port in said shaft on the other side of said piston, said port connecting with a discharge conduit, and a valve in said body synchronized for movement with the movement of said piston, said valve cutting across said chamber and the path of said piston at a plurality of points to divide same into inlet and discharge regions, respectively, as the piston and valve rotate in said chamber, said valve having a cutaway portion to accommodate the passage of the the piston, the intersection of the valve with the chamber on the inlet side of the piston forming therein an expansible chamber which increases in volume until the valve intersects said chamber on the discharge side of the piston, whereupon the valve opens on the inlet side of the piston, forming a compression chamber between the discharge side of the piston and said valve.

References Cited in the file of this patent
UNITED STATES PATENTS

| | | |
|---|---|---|
| 610,084 | Richards et al. | Aug. 30, 1898 |
| 649,122 | Allen | May 8, 1900 |
| 668,878 | Jensen | Feb. 26, 1901 |
| 684,874 | Simon | Oct. 22, 1901 |
| 958,416 | Metcalf et al. | May 17, 1910 |
| 1,078,870 | Nyquist | Nov. 18, 1913 |
| 1,266,605 | Madero | May 21, 1918 |
| 1,562,299 | Cundy | Nov. 17, 1925 |
| 1,713,378 | Engman | May 14, 1929 |
| 1,773,635 | Simmons | Aug. 19, 1930 |
| 1,942,441 | Morgan | Jan. 9, 1934 |
| 1,979,368 | Conklin | Nov. 6, 1934 |
| 2,273,625 | Concannon | Feb. 17, 1942 |
| 2,611,323 | Digney | Sept. 23, 1952 |

FOREIGN PATENTS

| | | |
|---|---|---|
| 1,954 | Great Britain | of 1877 |